(12) United States Patent
Mick

(10) Patent No.: US 6,987,787 B1
(45) Date of Patent: Jan. 17, 2006

(54) LED BRIGHTNESS CONTROL SYSTEM FOR A WIDE-RANGE OF LUMINANCE CONTROL

(75) Inventor: Perry J. Mick, McMinnville, OR (US)

(73) Assignee: Rockwell Collins, Cedar Rapids, IA (US)

( * ) Notice: Subject to any disclaimer, the term of this patent is extended or adjusted under 35 U.S.C. 154(b) by 4 days.

(21) Appl. No.: 10/878,149

(22) Filed: Jun. 28, 2004

(51) Int. Cl.
*H01S 3/13* (2006.01)

(52) U.S. Cl. .............................. 372/29.021; 372/29.02; 372/38.07

(58) Field of Classification Search ........... 372/29.021, 372/29.02, 38.07
See application file for complete search history.

(56) References Cited

U.S. PATENT DOCUMENTS

| | | | | |
|---|---|---|---|---|
| 4,745,358 A | * | 5/1988 | Yada et al. ................ 324/99 D |
| 4,827,116 A | * | 5/1989 | Takagi et al. ................ 250/205 |
| 5,803,579 A | | 9/1998 | Turnbull .................... 362/83.1 |
| 6,392,358 B1 | | 5/2002 | Runau ..................... 315/185 R |
| 6,419,372 B1 | | 7/2002 | Shaw ......................... 362/231 |
| 6,457,837 B1 | | 10/2002 | Steffensmeier ............... 362/19 |
| 6,521,879 B1 | | 2/2003 | Rand .......................... 205/205 |
| 6,540,363 B1 | | 4/2003 | Steffensmeier ............... 353/31 |
| 6,590,560 B1 | | 7/2003 | Lucas ......................... 345/102 |
| 6,597,209 B2 | * | 7/2003 | Iguchi et al. ................ 327/108 |
| 6,608,614 B1 | | 8/2003 | Johnson ...................... 345/102 |
| 6,639,349 B1 | | 10/2003 | Bahadur ..................... 313/483 |
| 6,666,896 B1 | | 12/2003 | Peng ........................... 353/94 |
| 6,825,619 B2 | * | 11/2004 | Norris ........................ 315/149 |
| 2005/0129075 A1 | * | 6/2005 | Anderson et al. ........ 372/38.02 |

* cited by examiner

*Primary Examiner*—Tuyet Thi Vo
(74) *Attorney, Agent, or Firm*—Nathan O. Jensen; Kyle Eppele

(57) ABSTRACT

The LED brightness control system for a wide range of luminance control includes a brightness control module that provides a pulse width modulation (PWM) control signal and a peak current control signal. A pulse width modulation (PWM) converter circuit receives the PWM control signal and converts it to a PWM signal. A multiplier receives the PWM signal and the peak current control signal from the brightness control module and multiplies the same to provide a light emitting diode (LED) current control signal with a variable "on" time as well as variable "on" level. A voltage-controlled current source utilizes the LED current control signal and an LED current feedback signal for providing an LED current. An LED illuminator array receives the LED current. A current sensing element connected to the LED illuminator array for providing an LED current feedback signal representing LED peak current. The voltage-controlled current source controls a drive voltage to the LED illuminator array at a commanded level.

20 Claims, 8 Drawing Sheets

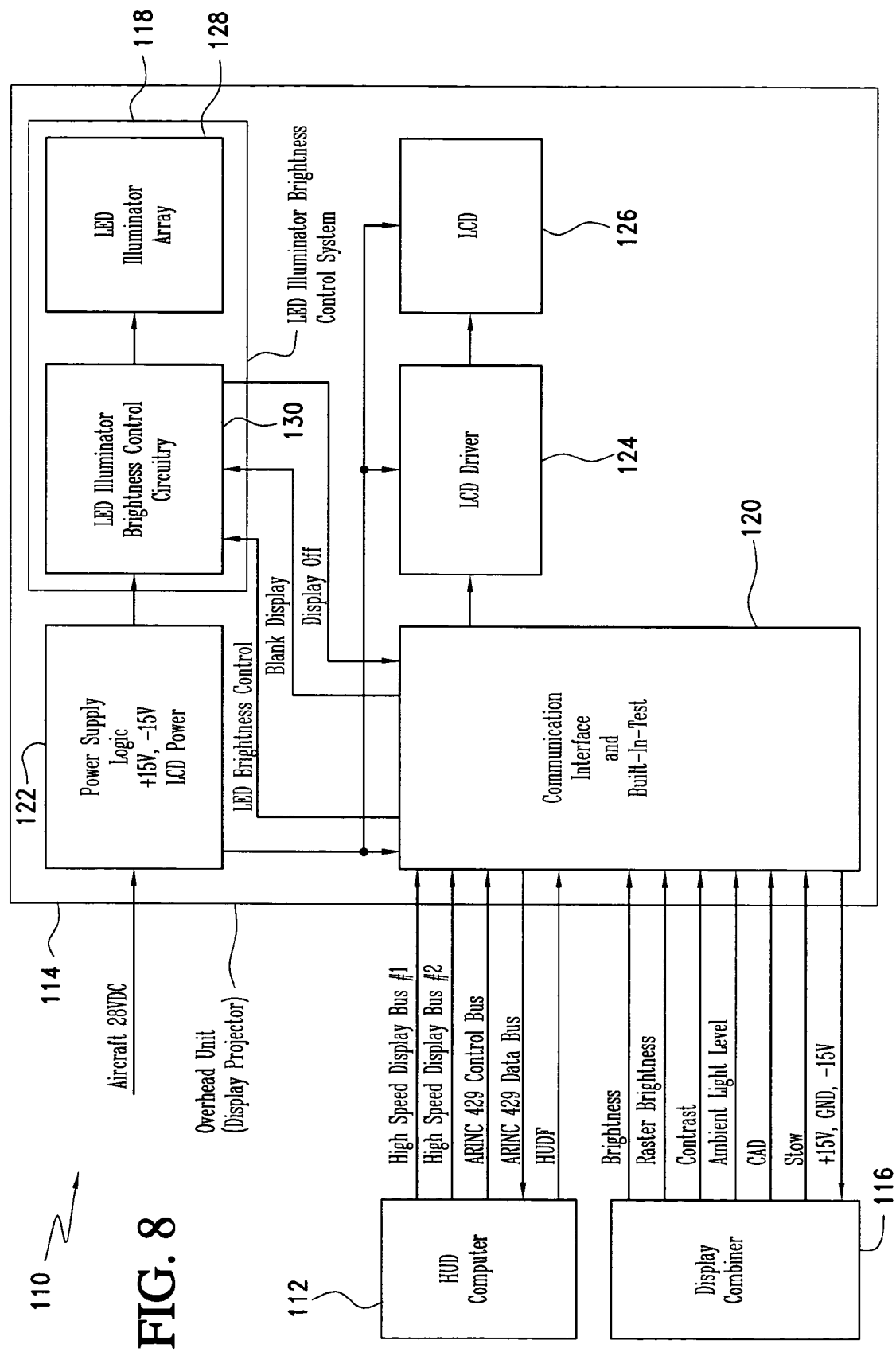

LED BRIGHTNESS CONTROL SYSTEM FOR A WIDE-RANGE OF LUMINANCE CONTROL

BACKGROUND OF THE INVENTION

1. Field of the Invention

The present invention relates to LED brightness control systems and more particularly to the control of an LED source for LCD backlighting over a wide range.

2. Description of the Related Art

In the manufacture and use of liquid crystal displays, backlighting from a light source is dispersed evenly beneath the surface of a liquid crystal display to allow optimal viewing of the display in all types of ambient light conditions. Depending upon the light conditions of the environment, the light intensity of the backlight may be adjusted to allow optimal viewing of the liquid crystal display. Liquid crystal display backlights frequently employ fluorescent lamps. However, fluorescent lamps require high power and a high voltage source. Another method of providing backlight is through the utilization of light emitting diodes. Light emitting diodes are utilized for backlights in liquid crystal displays due to their dimming range, low-temperature performance, and efficient heatsinking attributes.

The brightness of an light-emitting diode (LED) source for Head-Up Display (HUD) liquid-crystal display (LCD) backlighting must be controlled over a range of at least 20,000 to 1. It is impractical to drive the LED illuminator, which can consist of an array of LEDs, with a variable DC source to very low current levels as the LED light output becomes unstable with possible spectral shifts.

There are a number of patents that discuss different brightness controls for LED sources for LCD backlighting. For example, U.S. Pat. No. 6,608,614 B1, issued to R. J. Johnson, discloses a backlight for an LCD that includes a first LED array that provides light with a first chromaticity and a second LED array that provides light with a second chromaticity. A combining element combines the light from the first LED array and the second LED array and directs the combined light toward the liquid crystal display. A control system is operationally connected to the second LED array. The controller adjusts the brightness of at least one LED in the second LED array to thereby adjust the chromaticity of the combined light.

U.S. Pat. No. 6,392,358, issued to A. L. Runau, discloses a system and method for directing the flow of current supplied for a collection of light emitting diodes to provide for rapid flashing of the light emitting diodes and a wide dimming range. A fixed amount of current may be available to the collection of light emitting diodes where the flow of the current may be controlled by an alternating periodic signal such that current passes through the light emitting diodes for predefined and discrete periods. During periods of time that current is not flowing through light emitting diodes, the current may be directed to flow in another area of the circuit. The duty cycle of the signal may be adjusted in order to vary the dimming capability of the backlight.

U.S. Pat. No. 5,803,579, issued to R. R. Turbull et al, disclose an illuminator assembly, having a plurality of LEDs on a vehicular support member in a manner such that, when all of the LEDs are energized, illumination exhibiting a first perceived hue, e.g., blue-green, and projected from at least one of the LEDs overlaps and mixes with illumination exhibiting a second perceived hue, e.g., amber, which is distinct from the first perceived hue and which is projected from at least one of the remaining LEDs in such a manner that this overlapped and mixed illumination forms a metameric white color and has sufficient intensity and color rendering qualities to be an effective illuminator.

Generally, the above patents do not address controlling LED brightness over a wide range. The '358 patent discusses using PWM (pulse width modulation) with a fixed current level. As will be disclosed below, the present patent application provides PWM control in addition to variable current control, to provide a much wider range of brightness control by performing a "multiplying" function to the two control inputs (peak current control and PWM control).

SUMMARY OF THE INVENTION

In a broad aspect, the present invention is an LED brightness control system for a wide range of luminance control. A brightness control module provides a pulse width modulation (PWM) control signal and a peak current control signal. A pulse width modulation (PWM) converter circuit receives the PWM control signal and converts it to a PWM signal. A multiplier receives the PWM signal and the peak current control signal from the brightness control module and multiplies the same to provide a light emitting diode (LED) current control signal with a variable "on" time as well as variable "on" level. A voltage-controlled current source utilizes the LED current control signal and an LED current feedback signal for providing an LED current. An LED illuminator array receives the LED current. A current sensing element is connected to the LED illuminator array for providing an LED current feedback signal representing LED peak current. The voltage-controlled current source controls a drive voltage to the LED illuminator array at a commanded level.

Thus, the present invention utilizes a combination of direct control of the peak current in the LED illuminator and Pulse Width Modulation (PWM) to control the brightness of the LED over a very wide range.

Lower brightness can be achieved by Pulse-Width-Modulating (PWM) the voltage to the LED with a higher peak LED current level than a low level DC current. But PWM over such a large range (20,000 to 1) is also difficult, resulting in very low duty cycles. By combining linear control of the LED current over a limited range with PWM over a limited range, the full 20,000 to 1 brightness range can be achieved. The effect is as if the PWM signal is multiplied by the Current Level signal. If a PWM range of at least 1:142 is possible, as well as a peak current range of at least 1:142, 142*142=20,164. The brightness output of an LED is roughly proportional to the average current in the device.

The system can be implemented simply with an analog implementation. Using a digital implementation, the brightness control to LED brightness relationship can be made non-linear in the desired manner dictated by the application. Also, non-linearities in the LED brightness to LED current relationship can be corrected.

BRIEF DESCRIPTION OF THE DRAWINGS

FIG. 8 is a block diagram of a complete LCD/LED projection display system.

DETAILED DESCRIPTION OF THE INVENTION

Figure 1:
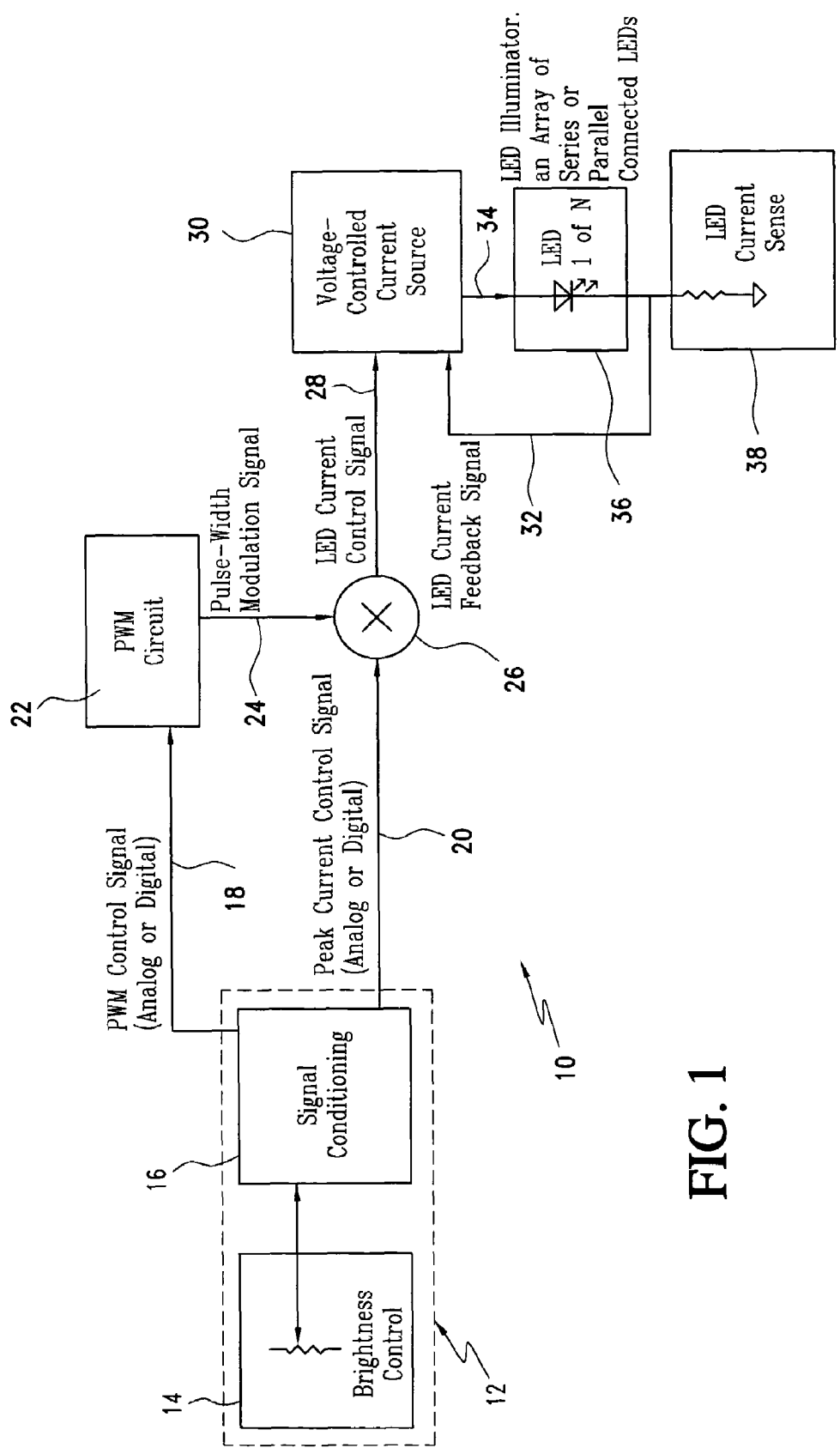
FIG. 1 is a fundamental block diagram of the LED brightness control system of the present invention.

Referring now to the drawings and the characters of reference marked thereon, FIG. 1 illustrates a preferred embodiment of the LED brightness control system of the present invention, designated generally as 10, showing the system in a fundamental form. The LED brightness control system 10 includes a brightness control module, designated generally as 12. The brightness control module typically includes a brightness control element 14 connected to a signal conditioning element 16. The brightness control element 14 may comprise, for example, a variable resistive element with a voltage output signal. The signal conditioning element 16 typically comprises buffering amplifiers with offset, scaling, and possibly non-linear control, or an embedded display control computer system having a digital look-up table. The brightness control module 12 provides a pulse width modulation (PWM) control signal 18 and a peak current control signal 20.

A pulse width modulation (PWM) converter circuit 22 receives the PWM control signal 18 and converts it to a PWM signal 24. The pulse width modulation (PWM) converter circuit 22 may be analog or may be digital as will be explained below in more detail.

A multiplier 26 receives the PWM signal 24 and the peak current control signal 20 from the brightness control module 12 and multiplies the two to provide a light emitting diode (LED) current control signal 28 with a variable "on" time as well as variable "on" level. The multiplier 26 may be, for example, an analog multiplier or an analog switch using the PWM signal to gate the current control signal.

A voltage-controlled current source 30 utilizes the LED current control signal 28 and an LED current feedback signal 32 and provides an LED current 34. The voltage-controlled current source 30 may be, for example an error amplifier controlling a transistor.

The LED current 34 is provided to an LED illuminator array 36. The voltage-controlled current source 30 controls a drive voltage to the LED illuminator array 36 at a commanded level. The LED illuminator array 36 can be a parallel or series combination of LEDs.

A current sensing element 38 is connected to the LED illuminator array 36 for sensing the LED current feedback signal 32 representing LED peak current. The current sensing element 38 is preferably a current sense resistor. It senses current and feeds the signal back to keep the LED current at the commanded level.

Figure 2:
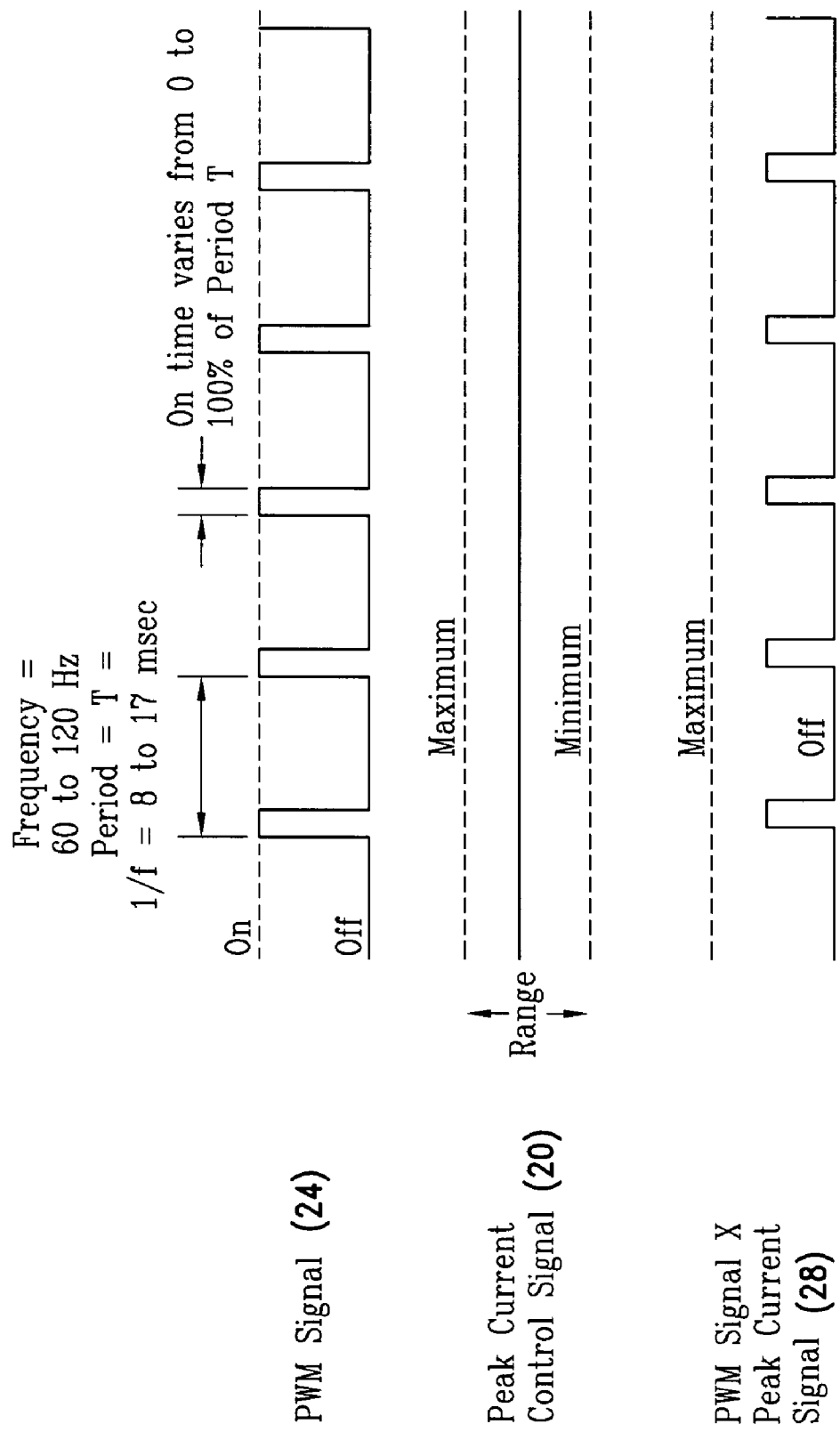
FIG. 2 are graphs showing the characteristics of the LED drive signals of the LED brightness control system.

Referring now to FIG. 2, the characteristics of the LED drive signals are illustrated. The upper signal in this Figure represents the PWM signal 24, the middle signal represents the peak current control signal 20, and the lower signal represents the resultant LED current control signal 28.

The overriding constraint on PWM frequency (f) is the rate at which flicker begins to occur. This is typically 60 Hz. So the PWM frequency should be set to 60 Hz or greater. The PWM can also be synchronized with the LCD refresh rate. The reciprocal of the frequency is known as the period (T), in the case of a 60 Hz signal the period is 16.7 milliseconds. PWM varies the amount of time that the pulse is in the "on" state as shown in FIG. 2.

As mentioned above, the PWM 24 signal is multipled by the peak current control signal 20, resulting in a LED current control signal 28 with a variable "on" time as well as variable "on" level, as shown in this Figure.

Figure 3:
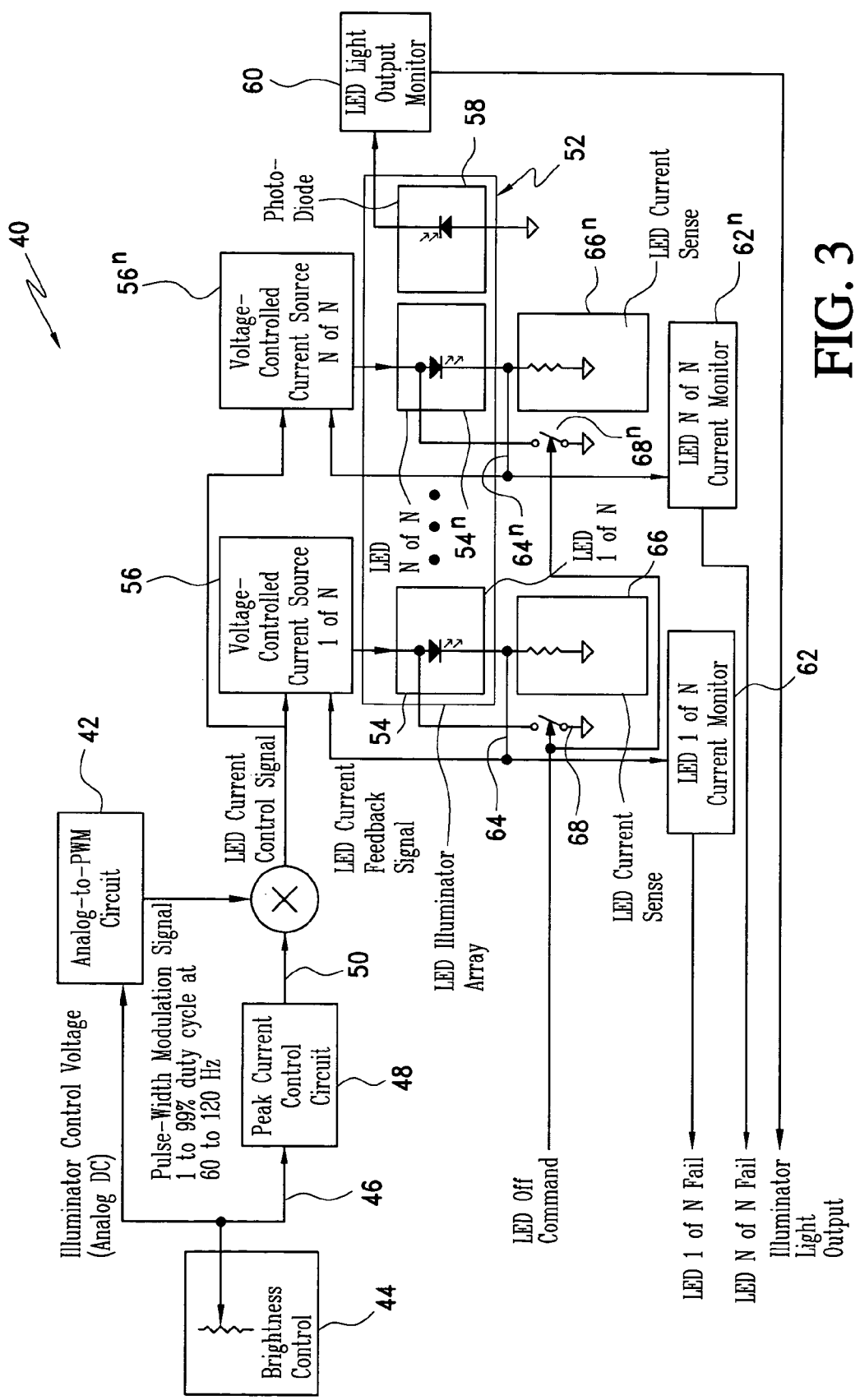
FIG. 3 is a block diagram illustrating a basic analog implementation of the present invention.

Referring now to FIG. 3, a basic analog implementation of present invention is illustrated, designated generally as 40. The analog LED brightness control system 40 utilizes a PWM converter circuit that comprises an analog-PWM circuit 42. The analog-PWM circuit 42 may be, for example, a conventional comparator circuit with a variable DC input for PWM control at one input and a fixed-frequency ramping waveform at the other input.

In this analog example, the brightness control module comprises a brightness control element 44 for providing an analog DC illuminator control voltage 46 to the analog-PWM circuit 42. One input of a voltage comparator of a conventional comparator circuit that may comprise the analog-PWM circuit 42 is the analog DC illuminator control voltage 46. In this instance, an internal ramp generator provides a ramp signal that is also provided as an input to the voltage comparator. A peak current control circuit 48 of the brightness control module utilizes the analog DC illuminator control voltage 46 to provide the peak current control signal 50. This peak current control signal 50 is an analog peak current control signal.

The LED illuminator array, designated generally as 52 includes a plurality of parallel connected LEDs 54, . . . $54^n$.

The voltage-controlled current source, in this instance, comprises a plurality of drive circuits (i.e. voltage-controlled current sources) 56 . . . $56^n$, each drive circuit being associated with a respective LED 54. Each voltage-controlled current source 56 controls a drive voltage to its respective LED 54.

The LED illuminator array comprises a photodiode 58 which is mechanically (but not electrically) connected to the parallel connected LEDs 54 for providing a signal that is proportional to total light output.

An LED light output monitor 60 is connected to the photodiode 58 for buffering and scaling of the photodiode signal.

Current monitors 62, . . . $62^n$ are arranged to receive their respective LED current feedback signals 64, . . . $64^n$ from associated current sensors 66, . . . $66^n$ to detect the failure of an LED or it's associated driver circuit.

Switches 68, . . . $68^n$ are connected across the LED's 54 to ensure that there is no voltage on the LEDs when they are desired to be turned off. This provides assurance that they are off even if there is a failure of an LED driver. There are alternate ways of turning off the LEDs, such as forcing the PWM or current control signals to zero.

As mentioned above, FIG. 3 shows a simple analog method of implementation. The LEDs are shown in a parallel arrangement, with a drive circuit for each LED. This is the best arrangement to detect the failure of an individual LED. Additional elements that are shown, such as the photodiode detection of total light output, individual LED failure detection, and a separate signal to turn off the LED illuminator independent of brightness control setting are elements which are important to the use of the LED illuminator in an aircraft display environment, but may not be necessary in other applications. As mentioned before, the LEDs could also be arranged in a series connection rather than parallel. The PWM circuit in this case is controlled by an analog signal.

Figure 4:
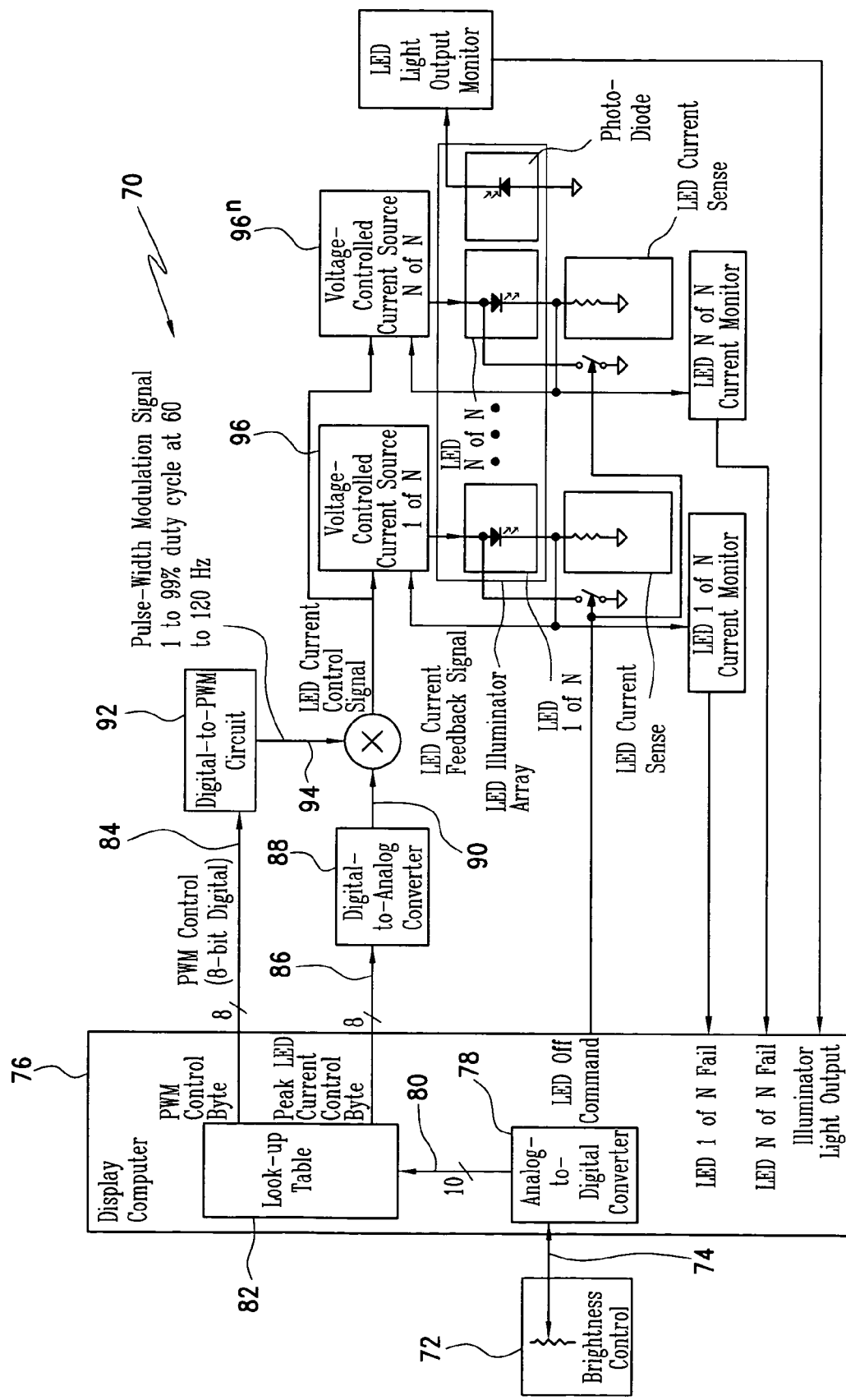
FIG. 4 is a block diagram illustrating a basic digital implementation of the present invention.

Referring now to FIG. 4, a basic digital implementation of the present invention is illustrated, designated generally as 70. In this instance the LED brightness control system 70 includes a brightness control module that includes a brightness control element 72 for providing an analog brightness control signal 74 and a computer system 76. The computer system 76 includes an analog-to-digital converter 78 for receiving the analog brightness control signal 74 and providing a digital output signal 80.

A digital look-up table 82 receives the digital output signal 80 and corrects for non-linearities in the LED brightness/current relationship the result of the correction providing two digital control signals 84, 86—a PWM control signal 84 and a peak LED current control output 88. The analog brightness control signal 74 is converted to a 10-bit digital signal by the analog-to-digital converter 78. As mentioned, this signal is applied to the look-up table (LUT) 82. The output of the LUT is two 8-bit digital control signals 84, 86. This design gives maximum flexibility to control the actual brightness output of the LED array, correcting for non-linearities in LED brightness vs. applied average current.

A digital-to-analog converter 88 receives the peak LED current control output 86 from the digital lookup table 82 and converts the peak LED current control output 86 to an analog peak current control signal 90. A PWM converter circuit, which in this instance comprises a digital-to-PWM circuit 92, provides the PWM signal 94.

The 10-bit input control signal 80 gives 1024 discrete brightness levels. The 8-bit resolution of the PWM control signal 84 gives a 256:1 PWM ratio. The 8-bit resolution of the LED Peak Current control 86 gives a 256:1 ratio of peak current in the LED array. 256 levels of LED current multiplied by a PWM range of 256 gives a total brightness range of 65,536 to 1, far in excess of the 20,000 to 1 required.

As the brightness control is linearly increased from minimum to maximum, both the PWM and peak current control signals could increase linearly from minimum to maximum. The resulting multiplication of the two signals results in a square-law output to the LED driver circuits 96 . . . 96″. This results in more resolution at the lower brightness levels where it is required for night flight. There is less resolution at the higher brightness levels where it is not required. LED brightness is proportional to the average drive current, however brightness perceived by the human being is a log scale.

The LUT method provides maximum flexibility, to perhaps use a narrower PWM control range and a wider Peak Current control range, or vice versa. It can also be programmed to result in a brightness control input to LED brightness output overall curve that is something other than square-law or to correct for non-linearities in the LED current to LED luminance characteristics.

Multiple LEDs in the illuminator array are preferably driven in parallel for redundancy and LED fault detection; however, a simple version of this invention can be used to drive LEDs connected in serial also, as previously mentioned.

Figure 5:
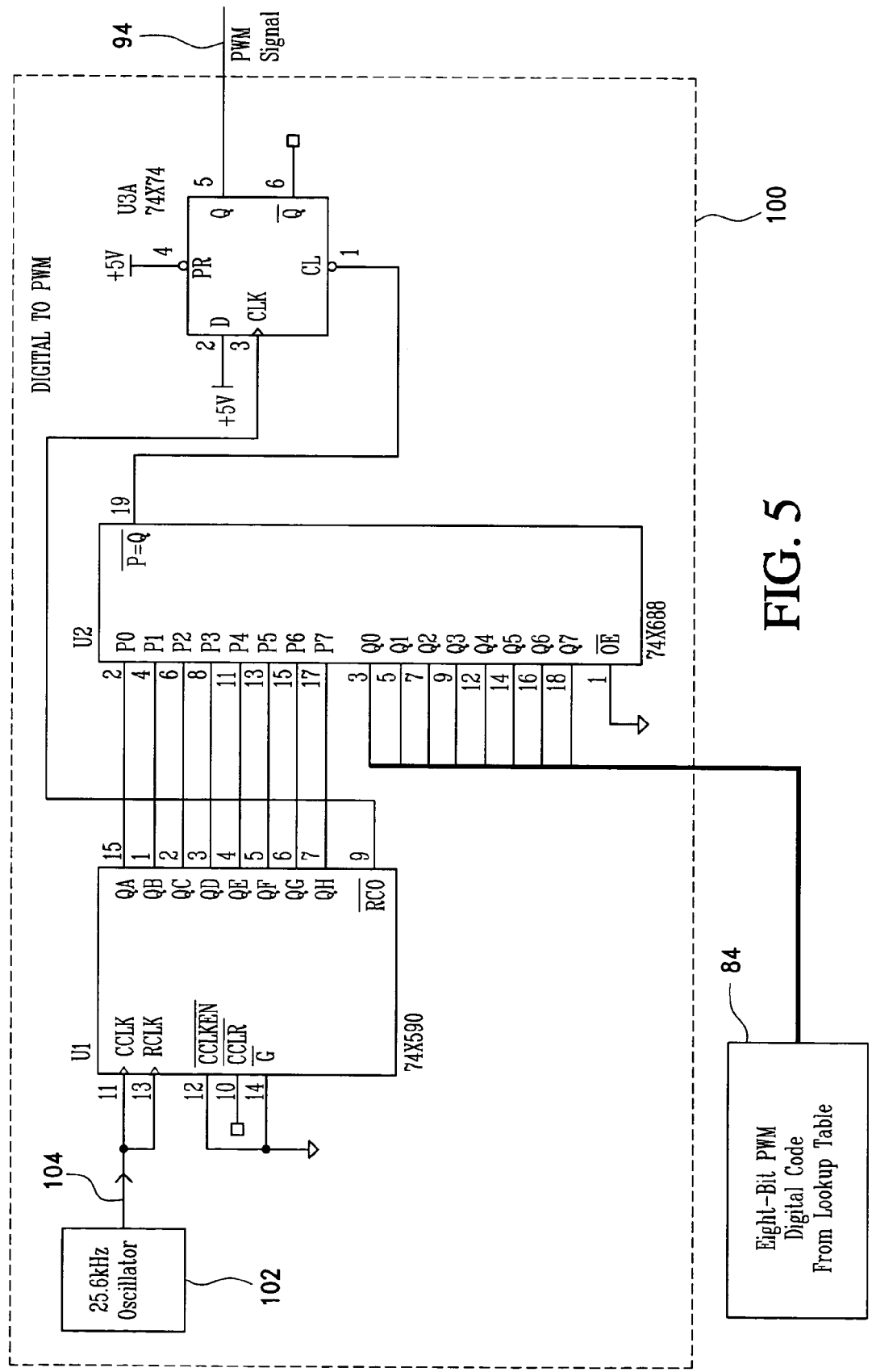
FIG. 5 is a schematic diagram of an example digital-to-PWM circuit of the digital system of FIG. 4.

FIG. 5 shows one example of a digital-to-PWM circuit, designated generally as 100. The digital output 84 of the LUT 82 is applied to this circuit 100, and the output is a PWM signal 94 proportional to the digital input.

An oscillator 102 is provided, with a clock frequency 256 times the desired PWM frequency. In this example, the PWM is 100 Hz, and the clock frequency is 25.6 kHz. If the PWM frequency were 1000 Hz, the clock frequency would be 256 kHz.

The oscillator output 104 is applied to a counter U1, causing U1 to count through the digital codes 0 to 255. Every time U1 counts through the full cycle of codes, it sends a set signal RCO to latch U3A, setting the PWM signal out of U3A to the on state. When the counter U1 digital code is equal to the digital code presented from the lookup table to the Q0–Q7 inputs of U2, the digital comparator U2 sends the signal P=Q to reset latch U3A. This causes the PWM output to drop to the off state until the counter U1 again reaches count 255, starting the cycle over again.

Figure 6:
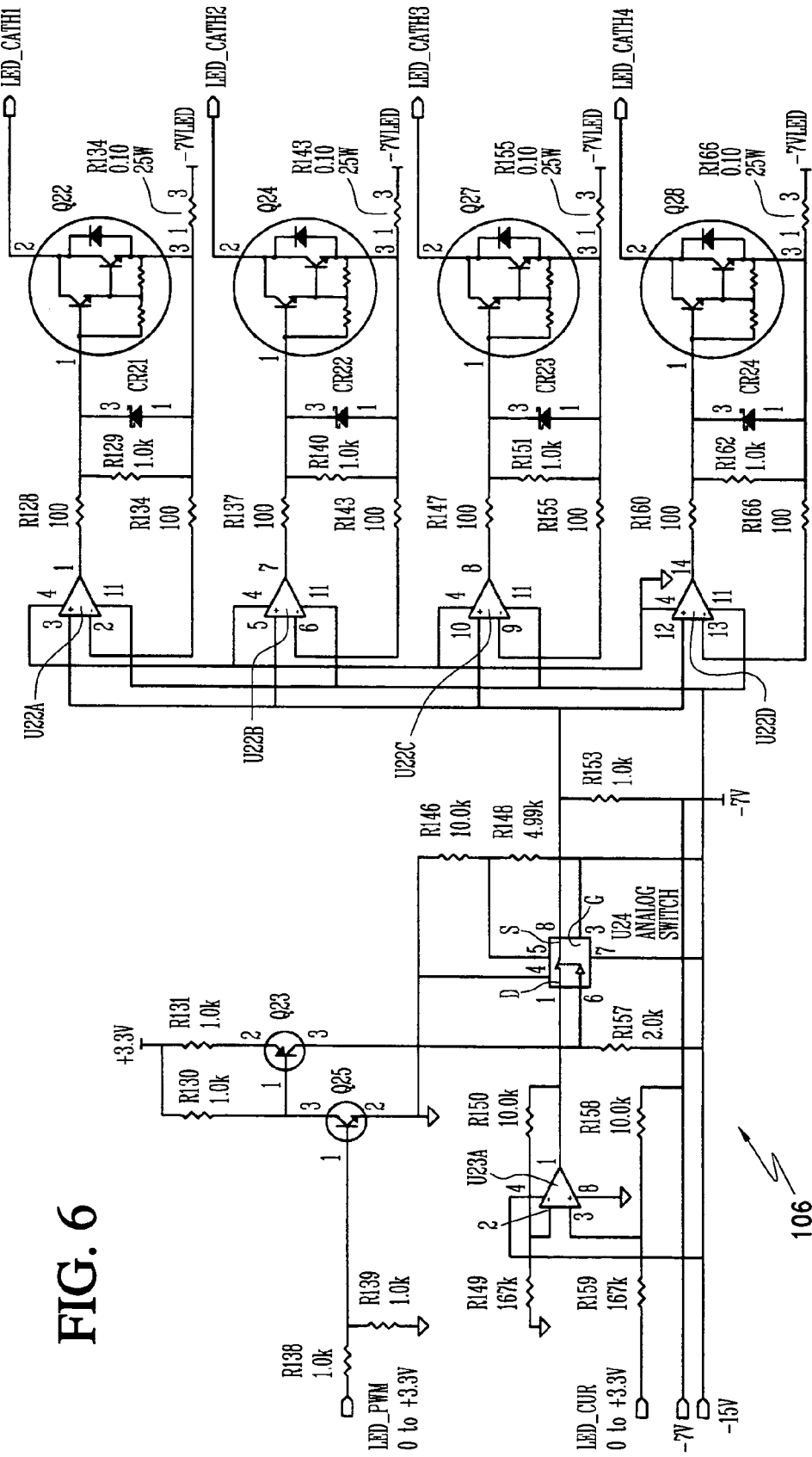
FIG. 6 is a schematic diagram of an example of an LED drive circuit in accordance with the principles of the present invention.

FIG. 6 shows one example of the LED drive circuit, designated generally as 106 that takes both the PWM signal and the peak current control signal as inputs. U23A is a differential amplifier that level-shifts the analog peak LED current control signal (LED_CUR). This analog signal comes from the digital-to-analog converter (DAC) that converts the digital peak LED current control signal to an analog signal.

The output of the digital-to-PWM or the analog-to-PWM, the LED PWM control signal (LED_PWM) is applied through level-shifting circuits Q25 and Q23 to analog switch U24. U24 performs the equivalent function of multiplying the PWM control signal with the Peak Current control signal. The PWM signal gates the analog Peak current signal out of U23A to the four LED voltage-to-current converters.

Amplifiers U22A, U22B, U22C, U22D, transistors Q22, Q24, Q27, Q28, and associated parts are the voltage-to-current converters. They convert the LED current control signal to an actual current in the four LEDs. R134, R143, R155, R166 are the LED current sense elements, used to feedback and control the current in each LED.

Figure 7:
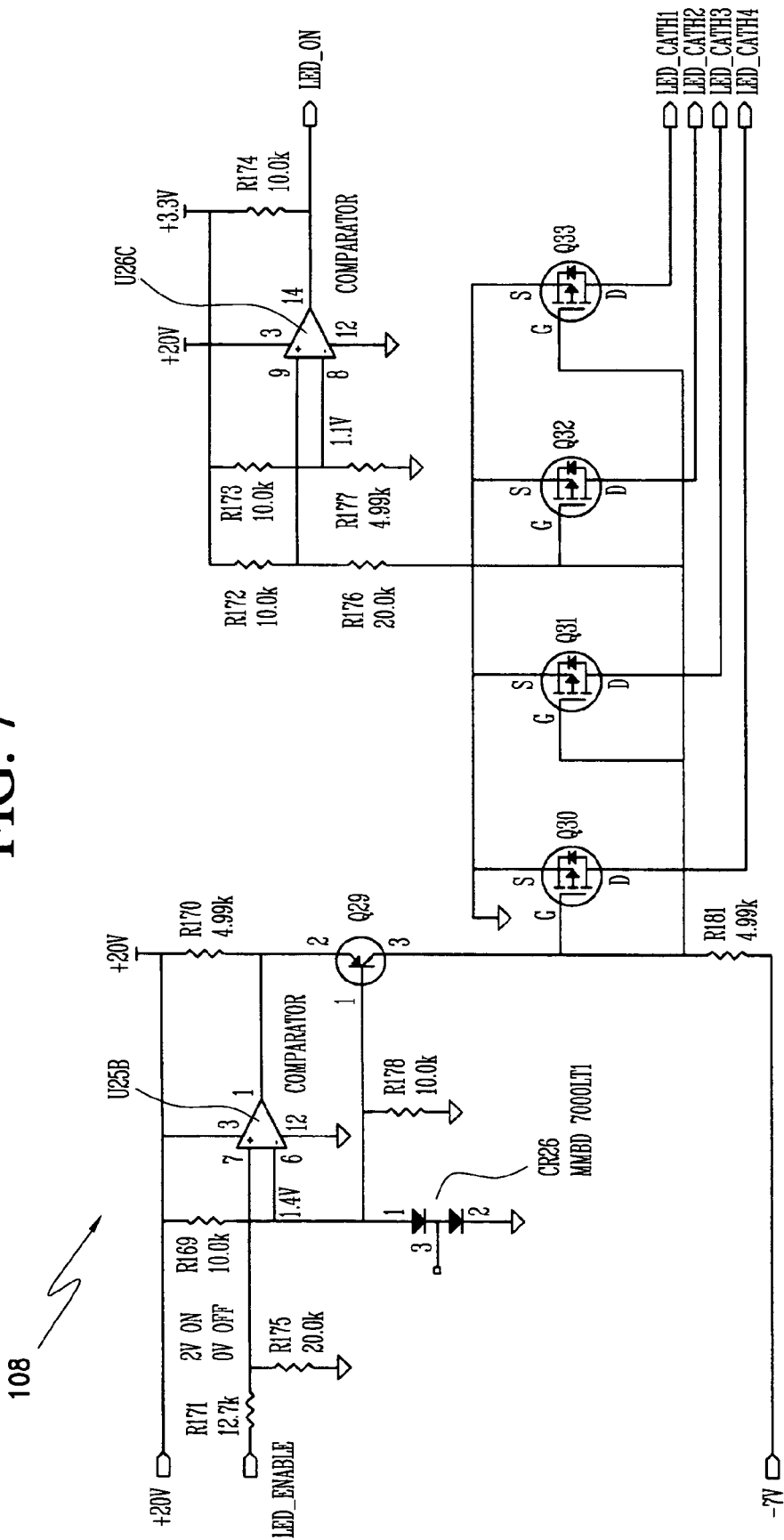
FIG. 7 is a schematic diagram of an LED turn off circuit illustrating a method for turning off the LEDs and ensuring that they are off.

FIG. 7 shows a system for turning off the parallel LEDs and ensuring they are off even if the drive circuits fail, designated generally as 108. The LED ENABLE signal (from a controlling computer) is applied through comparator U25B and transistor Q29 to Q30, Q31, Q32, and Q33. U25B and Q29 perform a level-shifting function. Transistors Q30, Q31, Q32, and Q33 are switches that force the voltage across each LED to 0V, and any current commanded to flow through the LEDs by the normal PWM system will instead flow through the switches. This allows the LEDs to be turned off regardless of the signal applied to the PWM system, or even if the PWM system has a failure.

FIG. 8 shows a block diagram of a complete LCD/LED projection display system, designated generally as 110. This system is embodied as a HUD (Head-Up Display) system that comprises three components. The first component is a HUD Computer (HC) 112 that processes aircraft input signals (not shown) to provide a display to the pilot. The second component is the Overhead Unit (OHU) 114, a projector mounted in the aircraft cockpit over the pilot's head that projects an image forward focused at infinity. The image is displayed on the third component of the system, the Combiner 116. The pilot can see the image on the Combiner 116 overlaid over the real world outside. The LED brightness control system 118, i.e. an LED illumination control system, which has been the principal focus of this patent application, is contained within the Overhead Unit projector 114.

The HUD Computer 112 accepts many inputs from the aircraft systems. Only the control and data signals to the OHU 114 are shown.) The HC 112 provides actual display data to the OHU 114 via two high speed digital data busses. The HC 112 also provides other display control functions via a slower ARINC 429 digital Control Bus. The OHU 114 sends status and other data back to the HC 112 via another ARINC 429 data bus. The HC 112 also sends a discrete signal, called HUD Fail (HUDF), to the OHU 114, to immediately blank the display in case of an error, so that invalid information is never presented to the pilot.

The Combiner 116 is the primary element used by the pilot. It displays the HC generated image overlaid with the real world, and it also contains several control signals, some accessible by the pilot. The Combiner 116 receives its electrical power from the OHU 114. Brightness and Contrast controls are pilot selectable, and sent to the OHU 114 for processing. The Combiner 116 contains an Ambient Light Sensor (ALS) that detects the ambient light level in the cockpit, and sends this signal to the OHU 114. The display brightness is automatically compensated to adjust for changes in ambient light level. The Combiner 116 can be rotated out of the pilot's field of view, in case it is not needed. This is called the "stowed" condition, and the signal "Stow" is sent to the OHU 114 so that the display projection is turned off if the Combiner 116 is stowed. When the Combiner 116 is unstowed and returned to operational position, a circuit called the Combiner Alignment Detector (CAD) verifies the Combiner 116 is positioned correctly for accurately positioning the display with the outside real world. The CAD status is also reported to the HC 112 by passing through the OHU 114.

The OHU 114 accepts signals from the HC 112 and the Combiner 116, previously discussed. Internal to the OHU 114 is a Communication Interface 120 for accepting and sending the various digital and analog signals to and from the HC 112 and Combiner 116. There is also a Built-In-Test (BIT) monitoring function, to verify the electronics within the OHU 114 are operating correctly.

The OHU 114 accepts +28VDC power from the aircraft, and contains an internal power supply 122 to generate various voltages used by the internal circuits of the OHU 114. The Communication Interface 120 provides display signals to the LCD driver 124 which, in turn, uses an LCD drive signal to drive the LCD 126 to generate the display image. The LCD 126 and the LED Illuminator Array 128 are part of a projector with optics internal to the OHU 114.

The present patent application has a focus relative to the block "LED Illuminator Brightness Control System" 118, comprised of sub-blocks LED Illuminator Brightness Control Circuitry 130 and the LED Illuminator Array 128. The LED Illuminator Brightness Control Circuitry 130 accepts power from the Power Supply block 122. It accepts a brightness control signal that is derived from a combination of the Brightness, Raster Brightness, Contrast, and Ambient Light Level signals from the Combiner 116. The LED Illuminator Brightness Control Circuitry 130 accepts a Blank Display signal that is derived from the HUDF and Stow inputs from the HC 112 and Combiner 116, respectively. This signal immediately causes the LED Illuminator Array 128 to be turned off. A signal is sent back from the LED Illuminator Control Circuitry 130 to acknowledge that the LED Illuminator 128 has indeed been turned off. The LED Illuminator Brightness Control Circuitry 130 drives the LED Illuminator Array 128 with a combination of LED Peak Current control and Pulse-Width Modulation (PWM) as discussed above.

Although discussed above with reference to aircraft applications, this invention can be applied to any application where the brightness of LEDs needs to be controlled over a very wide luminance range. This could include, for example, automotive cabin and instrument lighting, or overhead projectors used in office presentations.

Other embodiments and configurations may be devised without departing from the spirit of the invention and the scope of the appended claims.

What is claimed is:

1. An LED brightness control system for a wide range of luminance control, comprising:
    a brightness control module for providing a pulse width modulation (PWM) control signal and a peak current control signal;
    a pulse width modulation (PWM) converter circuit for receiving said PWM control signal and converting it to a PWM signal;
    a multiplier for receiving said PWM signal and said peak current control signal from said brightness control module and for multiplying the same to provide a light emitting diode (LED) current control signal with a variable "on" time as well as variable "on" level;
    a voltage-controlled current source for utilizing said LED current control signal and an LED current feedback signal for providing an LED current;
    an LED illuminator array for receiving said LED current; and,
    a current sensing element connected to said LED illuminator array for providing an LED current feedback signal representing LED peak current,
    wherein said voltage-controlled current source controls a drive voltage to the LED illuminator array at a commanded level.

2. The LED brightness control system of claim 1 wherein said PWM converter circuit comprises an analog-PWM circuit.

3. The LED brightness control system of claim 1 wherein said PWM converter circuit comprises a digital-PWM circuit.

4. The LED brightness control system of claim 1 wherein said digital-to-PWM circuit, comprises:
    an oscillator for providing an output having a desired clock frequency;
    a counter for receiving said oscillator output, counting sequentially through a binary code and providing a set signal;
    a digital comparator for utilizing look up table data from said signal conditioning element and comparing it to a digital code of said counter to provide a reset signal; and,
    a latch for receiving said set signal and said reset signal and providing a latch output signal in response thereto, said latch output signal being said PWM signal.

5. The LED brightness control system of claim 1 wherein said brightness control module comprises a brightness control element connected to a signal conditioning element.

6. The LED brightness control system of claim 5 wherein said brightness control element comprises a variable resistive element with a voltage output signal.

7. The LED brightness control system of claim 5 wherein said signal conditioning element comprises a plurality of buffering amplifiers, with offset, scaling, and non-linear control.

8. The LED brightness control system of claim 5 wherein said signal conditioning element comprises an embedded display control computer system that includes a digital look-up table.

9. The LED brightness control system of claim 1 wherein:
    said PWM converter circuit comprises a digital-to-PWM circuit; and said brightness control module, comprises:
   a brightness control element for providing an analog brightness control signal; and,
   a computer system, comprising:
      an analog-to-digital converter for receiving said analog brightness control signal and providing a digital output signal, and;
      a digital look-up table for receiving said digital output signal and correcting for non-linearities in the LED current to LED brightness relationship the result of said correction providing two digital control signals, a first of said digital control signals being said PWM control signal and a second of said digital control signals being a peak LED current control output; and,
      a digital-to-analog converter for receiving said peak LED current control output from said digital lookup table and converting said peak LED current control output to an analog peak current control signal, said analog peak current control signal being said peak current control signal.

10. The LED brightness control system of claim 9 wherein said LED illuminator array comprises a plurality of parallel connected LEDs, said voltage-controlled current source comprising a plurality of drive circuits, each drive circuit being associated with a respective LED, wherein said voltage-controlled current source controls a drive current to the LED.

11. The LED brightness control system of claim 9 wherein:
   said LED illuminator array comprises a photodiode mechanically connected to said plurality of parallel connected LEDs for providing a signal proportional to total light output;
   said LED brightness control system further comprises an LED light output monitor connected to said photodiode for buffering and scaling of a photodiode signal of said photodiode;
   said current sensing element comprises a plurality of current sensors each connected to an associated LED for providing LED current feedback signals;
   said LED brightness control system further comprises a plurality of current monitors arranged to receive said LED current feedback signals from said current sensors for monitoring system function to determine if an individual LED or it's associated drive circuit has failed; and,
   said LED brightness control system further comprises turnoff means operably connected to said illuminator array for turning off said LEDs as desired.

12. The LED brightness control system of claim 1 wherein:
   said PWM converter circuit comprises an analog-PWM circuit; and,
   said brightness control module, comprises:
      a brightness control element for providing an analog DC illuminator control voltage to said analog-PWM circuit; and,
      a peak current control circuit for utilizing said analog DC illuminator control voltage to provide said peak current control signal, said peak current control signal being an analog peak current control signal.

13. The LED brightness control system of claim 12 wherein said LED illuminator array comprises a plurality of parallel connected LEDs, said voltage-controlled current source comprising a plurality of drive circuits, each drive circuit being associated with a respective LED, wherein said voltage-controlled current source controls a drive voltage to the LED.

14. The LED brightness control system of claim 13 wherein:
   said LED illuminator array comprises a photodiode mechanically connected to said plurality of parallel connected LEDs for providing a signal proportional to total light output;
   said LED brightness control system further comprises an LED light output monitor connected to said photodiode for buffering and scaling of a photodiode signal of said photodiode;
   said current sensing element comprises a plurality of current sensors each connected to an associated LED for providing LED current feedback signals;
   said LED brightness control system further comprises a plurality of current monitors arranged to receive said LED current feedback signals from said current sensors for monitoring system function to determine if an individual LED or it's associated drive circuit has failed; and,
   said LED brightness control system further comprises turnoff means operably connected to said illuminator array for turning off said LEDs as desired.

15. The LED brightness control system of claim 14 wherein said turnoff means comprises a plurality of switches each connected across an associated LED to assure that there is no voltage on said associated LED when it is desired to be turned off.

16. A head-up display (HUD) system, comprising:
   a HUD computer for providing control and data signals;
   an overhead unit (OHU), comprising:
      a communication interface for receiving said control and data signals and providing desired communication with other portions of said HUD system;
      an LED brightness control system, comprising:
         a brightness control module for providing a pulse width modulation (PWM) control signal and a peak current control signal from said control and data signals received from said communication interface;
         a pulse width modulation (PWM) converter circuit for receiving said PWM control signal and converting it to a PWM signal;
         a multiplier for receiving said PWM signal and said peak current control signal from said brightness control module and for multiplying the same to provide a light emitting diode (LED) current control signal with a variable "on" time as well as variable "on" level;
         a voltage-controlled current source for utilizing said LED current control signal and an LED current feedback signal for providing an LED current;
         an LED illuminator array for receiving said LED current; and,
         a current sensing element connected to said LED illuminator array for providing an LED current feedback signal representing LED peak current,
      wherein said voltage-controlled current source controls a drive voltage to the LED illuminator array at a commanded level; and,
      an LCD driver for receiving display signals from said communication interface and for providing an LCD drive signal;
      an LCD for generating a display image in response to said LCD drive signal; and, a power source for providing power to said communication interface; LED brightness control system, LCD driver, and LCD; and, a combiner including an ambient light sensor (ALS) that detects ambient light and sends an ambient light signal, brightness and contrast control signals to said OHU for processing.

17. The head-up display (HUD) system of claim 16, wherein said brightness control module comprises a brightness control element connected to a signal conditioning element.

18. The head-up display (HUD) system of claim 16, wherein said combiner may be rotated out of a pilot's field of view.

19. A method for providing a wide range of luminance control of an LED illuminator array, comprising the steps of:

providing a pulse width modulation (PWM) control signal and a peak current control signal;

receiving said PWM control signal and converting it to a PWM signal;

multiplying said PWM signal and said peak current control signal to provide a light emitting diode (LED) current control signal with a variable "on" time as well as variable "on" level;

utilizing said LED current control signal and an LED current feedback signal with a voltage-controlled current source for providing an LED current;

receiving said LED current with an LED illuminator array; and, utilizing a current sensing element connected to said LED illuminator array for providing an LED current feedback signal representing LED peak current, wherein said voltage-controlled current source controls a drive voltage to the LED illuminator array at a commanded level.

20. The method of claim 19, wherein said step of receiving said PWM control signal and converting it to a PWM signal comprises the step of utilizing a digital-PWM circuit.

* * * * *